United States Patent [19]

Seki et al.

[11] Patent Number: 5,283,750
[45] Date of Patent: Feb. 1, 1994

[54] AUTOMATIC EDITING METHOD FOR POLYHEDRON MACHINING PROCESSES

[75] Inventors: Masaki Seki, Suginami; Takashi Takegahara, Hachioji; Toru Matunaka, Yanai; Shizuaki Hayanagi, Oshino, all of Japan

[73] Assignee: Fanuc Ltd., Minamitsuru, Japan

[21] Appl. No.: 807,822

[22] PCT Filed: May 17, 1991

[86] PCT No.: PCT/JP91/00662

§ 371 Date: Jan. 23, 1992

§ 102(e) Date: Jan. 23, 1992

[87] PCT Pub. No.: WO91/19238

PCT Pub. Date: Dec. 12, 1991

[30] Foreign Application Priority Data

May 29, 1990 [JP] Japan .................... 2-137046

[51] Int. Cl.$^5$ ............... G06F 15/46; B23Q 15/00
[52] U.S. Cl. ................. 364/474.21; 483/1; 483/4; 364/192
[58] Field of Search ........... 364/474.21, 191, 192, 364/474.15; 483/1, 4, 5

[56] References Cited

U.S. PATENT DOCUMENTS 4,667,294 5/1987 Shima et al. ............ 364/474.21
4,739,488 4/1988 Asakura ............... 364/474.21

FOREIGN PATENT DOCUMENTS 0148273 7/1985 European Pat. Off. .
0220325 5/1987 European Pat. Off. .
62-251046 10/1987 Japan .

Primary Examiner—Jerry Smith
Assistant Examiner—Steven R. Garland
Attorney, Agent, or Firm—Staas & Halsey

[57] ABSTRACT

To embody a method for automatically editing multifaced polyhedron machining processes in a manner capable of efficiently operating a machine tool, a processor of an automatic programming apparatus causes a first one of definition statements associated with upper face machining to be transferred from a first file of a memory device of the programming apparatus to a second file and to be deleted from the first file (S13), and sequentially performs transfer of upper face machining process definition statements, specifying the same tool number as that specified by the first one of the upper face machining process definition statements, to the second file, and deletion of these statements from the first file. Similar processing is sequentially performed for each of different tool numbers, whereby the upper face machining process definition statements for each tool number are collectively stored in the second file. Similarly, side face machining process definition statements for each tool number are collectively stored in the second file in a manner separated from the upper face machining definition statements (S20-S25). As a result, a part program is edited in a manner reducing the number of times of shift between the upper face machining and the side face machining, to thereby make it possible to prepare a program capable of efficiently operating a machine tool of a type inevitably entailing tool exchange attributable to the shift between the upper face machining and the side face machining.

7 Claims, 3 Drawing Sheets

AUTOMATIC EDITING METHOD FOR POLYHEDRON MACHINING PROCESSES

TECHNICAL FIELD

The present invention relates to an automatic editing method for multi-faced polyhedron machining processes.

BACKGROUND ART

In a CAD/CAM system for effecting design and manufacture by using a computer, or in an automatic programming apparatus, editing is often performed to rearrange a plurality of machining process definition statements contained in input data or in a part program. For instance, a part program to effect center drilling and drilling onto one of faces of a polyhedron workpiece, and then effect similar two types of machining onto the next workpiece face is edited such that center drilling onto the respective workpiece faces is made successively, and then drilling thereon is performed in sequence, to thereby reduce the number of times of drill exchange.

A machining program prepared from the part program thus edited is suited to a specific type machine tool, e.g., a machine tool which comprises a spindle stock arranged to be swivelable between swivel positions respectively for workpiece upper face machining and for workpiece side face machining and movable in the vertical direction, and a workpiece table arranged to be swivelable around an axis perpendicular to the swivel axis of the spindle stock and movable in the horizontal direction. By means of the aforesaid machining program, the number of times of tool exchange can be reduced as intended. Namely, during the operation of the machine tool, a center drill is moved vertically downwardly in unison with the spindle stock which has a spindle mounted with the center drill and located at the workpiece upper face machining position, to thereby effect center drilling onto the upper face of the workpiece fixed to the table. Then, the center drill is retreated upwardly of the workpiece and the spindle stock is swiveled to the workpiece side face machining position, and then the workpiece is horizontally moved toward the center drill in unison with the table, to thereby effect center drilling onto the side face of the workpiece. Further, the workpiece is retreated from the center drill, the table is swiveled by 90 degrees around an axis perpendicular to the table face, and then the workpiece is horizontally moved toward the center drill side, to thereby effect center drilling onto another side face of the workpiece. Similarly, center drilling is performed onto the remaining two side faces of the workpiece. Then, with use of a drill mounted to the spindle in place of the center drill, drilling onto the upper and side faces of the workpiece is carried out.

In this manner, according to the machine tool provided with the swivelable spindle stock, two kinds of machining can be carried out onto the five faces of the workpiece fixed on the table.

From the viewpoint of improving operational efficiency, however, it is not always useful to operate other types of machine tool in accordance with a similar machining program. For instance, the number of times of tool exchange cannot be reduced as intended, by operating a machine tool of a type having a spindle for workpiece upper face machining and using a L-type attachment through which a tool, e.g., a drill is mounted to the spindle when machining onto a side face of the workpiece is effected, in accordance with the aforementioned machining program, in such a manner that center drilling onto the upper face and first and second side faces of the workpiece is sequentially carried out, and then drilling onto the respective workpiece faces is successively performed.

Namely, according to the machine tool using the L-type attachment, it is necessary to remove the center drill or the drill from the spindle, mount the L-type attachment on the spindle, and mount the center drill or the drill, removed from the spindle, or an equivalent tool to the L-type attachment, when a shift is made from center drilling of the workpiece upper face to center drilling of the workpiece first side face and from drilling of the workpiece upper face to drilling of the workpiece first side face. Further, when a shift is made from the center drilling onto the workpiece second side face to the drilling onto the workpiece upper face, it is necessary to remove the center drill from the L-type attachment, remove the L-type attachment from the spindle, and mount the drill on the spindle.

In the case of operating another type of machine tool having a first spindle for workpiece upper face machining and a second spindle for workpiece side face machining, in accordance with a similar machining program, tool exchange must be made between the first and second spindles each time a shift is made between workpiece upper face machining and workpiece side face machining.

As a consequence, according to a machining program prepared from a part program edited in a conventional manner, it is impossible to efficiently operate a machine tool of a type inevitably entailing tool exchange when a shift is made between workpiece upper face machining and workpiece side face machining.

DISCLOSURE OF THE INVENTION

The object of the present invention is to provide a method for automatically editing multi-faced polyhedron machining processes defined beforehand in relation to an operation of a machine tool of a type inevitably entailing tool exchange when a shift is made between workpiece upper face machining and workpiece side face machining, in a manner capable of efficiently operating the machine tool.

To achieve the aforementioned object, according to a first aspect of the present invention, a method comprises the steps of: (a) automatically dividing multi-faced polyhedron machining processes defined beforehand in relation to an operation of a machine tool of a type inevitably entailing tool exchange when a shift is made between workpiece upper face machining and workpiece side face machining, into a first group of machining processes associated with the workpiece upper face machining and a second group of machining processes associated with the workpiece side face machining; (b) automatically dividing the first group of machining processes into ones for respective types of tools employed to conduct the first group of machining processes; and (c) automatically dividing the second group of machining processes into ones for respective types of tools employed to conduct the second group of machining processes.

According to a second aspect of the present invention, a method comprises the steps of: (a) selecting a first editing mode when it is determined that multi-faced polyhedron machining processes are associated with a first type of machine tool, the multi-faced polyhedron machining processes being defined beforehand in relation to either one of the first type of machine tool inevitably entailing tool change when a shift is made between workpiece upper face machining and workpiece side face machining, and a second type of machine tool not inevitably entailing tool change when the aforesaid shift is made; (b) selecting a second editing mode when it is determined that the multi-faced polyhedron machining processes defined beforehand are associated with the second type of machine tool; (c) automatically dividing the multi-faced polyhedron machining processes defined beforehand into a first group of machining processes associated with the workpiece upper face machining and a second group of machining processes associated with the workpiece side face machining, automatically dividing the first group of machining processes into ones for respective types of tools employed to conduct the first group of machining processes, and automatically dividing the second group of machining processes into ones for respective types of tools employed to conduct the second group of machining processes, when the first editing mode is selected; and (d) automatically dividing the multi-faced polyhedron machining processes defined beforehand into ones for respective types of tools employed to conduct the multi-faced polyhedron machining processes.

As mentioned above, according to the first aspect of the present invention, multi-faced polyhedron machining processes defined beforehand in relation to a machine tool of a type inevitably entailing tool exchange when a shift is made between workpiece upper face machining and workpiece side face machining are divided into a first group of machining processes associated with the workpiece upper face machining and a second group of machining processes associated with the workpiece side face machining. Accordingly, it is possible to minimize the number of times of shifting between the workpiece upper face machining and the workpiece side face machining, and hence the number of times of tool exchange (the number of times of mounting and dismounting a L-type attachment) with the aforesaid shift. Since the machining processes associated with the workpiece upper face machining are divided into ones for respective types of tools to be employed, moreover, the workpiece upper face machining can be carried out with a reduced number of times of tool exchange. Further, since the machining processes associated with the workpiece side face machining are also divided in a similar manner, the number of times of tool exchange associated with the workpiece side face machining can be reduced. As a consequence, the workpiece upper and side face machining can be effectively carried out, with a reduced number of times of tool exchange, by means of the machine tool of the type entailing tool exchange when a shift is made between the workpiece upper face machining and the workpiece side face machining.

According to the second aspect of the present invention, the multi-faced polyhedron machining processes defined beforehand are edited in a first editing mode which is comprised of the same procedures as those of the first aspect of the invention, if these processes are associated with a machine tool of a first type inevitably entailing tool exchange upon shift between the workpiece upper face machining and the workpiece end face machining. On the other hand, if the polyhedron machining processes are associated with a machine tool of a second type not inevitably entailing tool exchange when a shift is made between the workpiece upper face machining and the workpiece side face machining, these processes are edited in a second editing mode wherein the machining processes are automatically divided into ones for tool types. This makes it possible to efficiently conduct workpiece upper and side face machining by means of various types of machine tools.

BEST MODE OF CARRYING OUT THE INVENTION

Machine tools to which the present invention is applied are each arranged to be drivingly controlled by a control unit which operates in accordance with a machining program, and include a machine tool of a first type inevitably entailing tool exchange when a shift is made between workpiece upper face machining and workpiece side face machining, and a machine tool of a second type not inevitably entailing tool exchange upon shift between the workpiece upper face machining and the workpiece side face machining. Typically, the first type of machine tool comprises a spindle for workpiece upper face machining, and is arranged to be mounted at its spindle with a tool through a L-type attachment when the workpiece side face machining is performed. Another machine tool of the first type comprises a first spindle for workpiece upper face machining and a second spindle for workpiece side face machining. The second type of machine tool comprises a spindle stock having a spindle detachably mounted thereon, and a table to which a workpiece is detachably mounted. Typically, the spindle stock is arranged to be swivelable between a swivel position for workpiece upper face machining and a swivel position for workpiece side face machining and to be movable in the vertical direction. The table is arranged to be swivelable around an axis perpendicular to the swivel axis of the spindle stock and to be movable in the horizontal direction.

Figure 1:
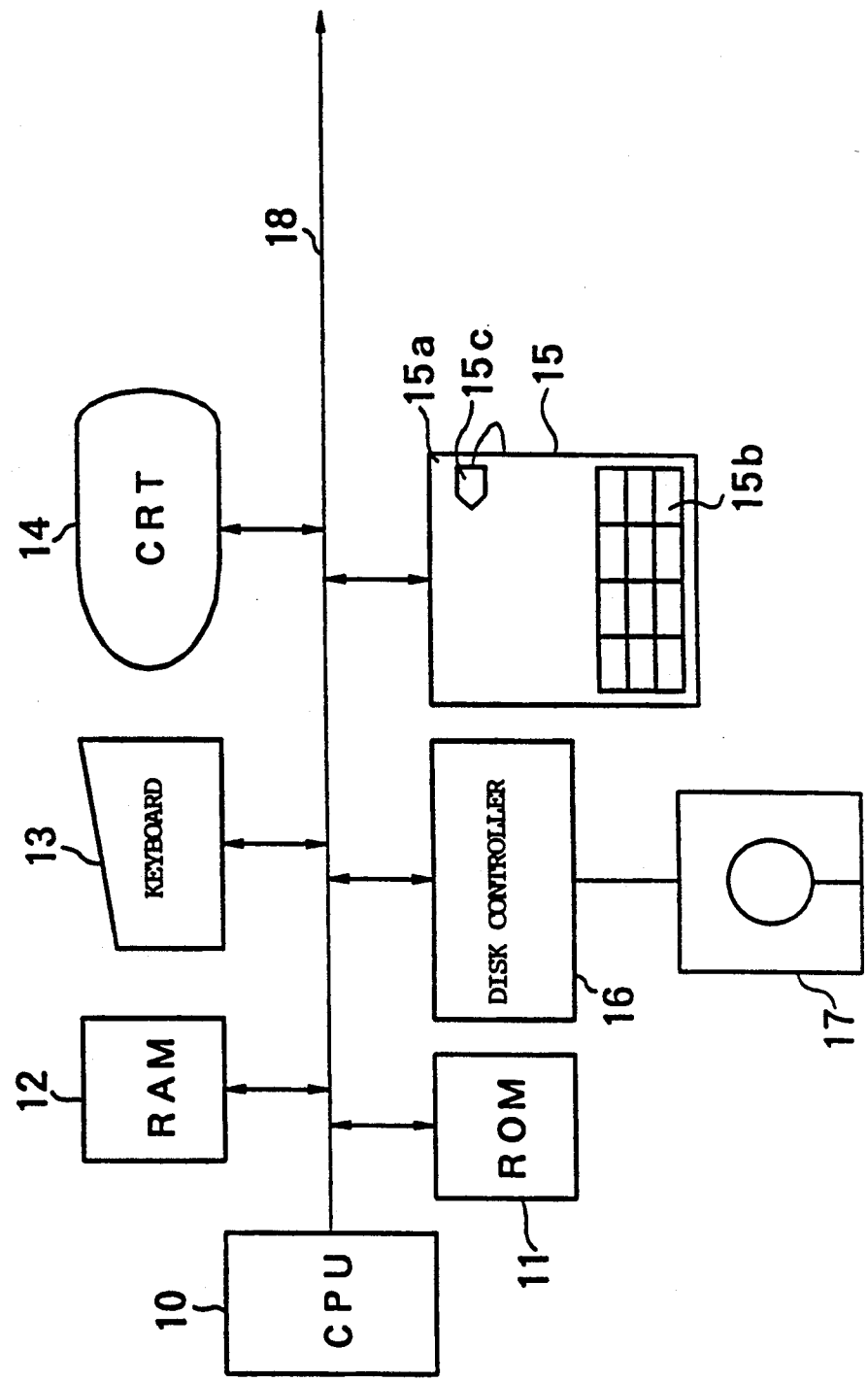
FIG. 1 is a schematic block diagram showing an essential part of an automatic programming apparatus.

Referring to FIG. 1, an automatic programming apparatus for embodying an editing method according to an embodiment of the present invention comprises a processor (CPU) 10, a read only memory (ROM) 11 storing therein a program for control of the programming apparatus, and a random access memory (RAM) 12 for temporally storing a system program, a part program, NC data (machining program) already prepared, results of operation by the processor, and the like. The programming apparatus further includes a keyboard 13, a display device (CRT) 14 having a CRT screen for displaying a graphic cursor, etc., a tablet device 15, and a disk controller 16 arranged to be mounted with a floppy disk 17. The elements 11–16 are connected through busses 18 to the CPU 10.

The keyboard 13 has character keys, ten key pad, command keys and function keys, and is arranged to input various commands, character data and numerical data to the CPU 10 in response to key operations by an operator. The tablet device 15 is provided with a tablet screen 15a corresponding to the CRT screen, a tablet menu table 15b for displaying various commands, and a table cursor (mouse) 15c arranged to be movable on the tablet screen 15a in a manner interlocked with the graphic cursor and movable on the tablet menu 15b. The tablet device 15 is arranged to input, to the CPU 10, a command specified on the tablet menu 15b by means of a tablet cursor operation by the operator.

Further, the programming apparatus is arranged to store, into the RAM 12, a part program prepared by the operator in an interactive fashion by the use of the keyboard 13, the CRT 14 and the tablet device 15, and to cause the thus prepared part program to be transferred from the RAM 12 to the floppy disk 17 and to be stored in the latter in response to a command by the operator. Moreover, the programming apparatus is designed to transfer the prepared part program stored in the floppy disk 17 and the system program registered in the floppy disk 17 from the floppy disk 17 to the RAM 12, and cause the programs to be stored in the RAM.

The part program, which is provided for automatic preparation, by the programming apparatus, of NC data for multi-faced polyhedron machining, includes a plurality of definition statements each defining a corresponding one of machining processes which are associated with upper face machining and side face machining of a workpiece of a multi-faced polyhedron (e.g., six-faced polyhedron workpiece). Each definition statement includes a code indicative of a type of machining face (e.g., upper face, a first side face, and a second side face) of the workpiece.

The system program includes a procedure for automatic process editing processing effected in a first editing mode by the programming apparatus, and a procedure for the processing effected in a second editing mode. The editing procedure in accordance with the first editing mode is determined such that multi-faced polyhedron machining processes defined beforehand are automatically divided into a first group of machining processes associated with workpiece upper face machining and a second group of machining processes associated with workpiece side face machining, the first group of machining processes are automatically divided into ones for respective types of tools employed for the first group of machining processes, and the second group of machining processes are automatically divided into ones for types of tools employed for the second group of machining processes. The editing procedure according to the second editing mode is determined such that the polyhedron machining processes are automatically divided into ones for types of tools employed for these processes.

Figure 2A:
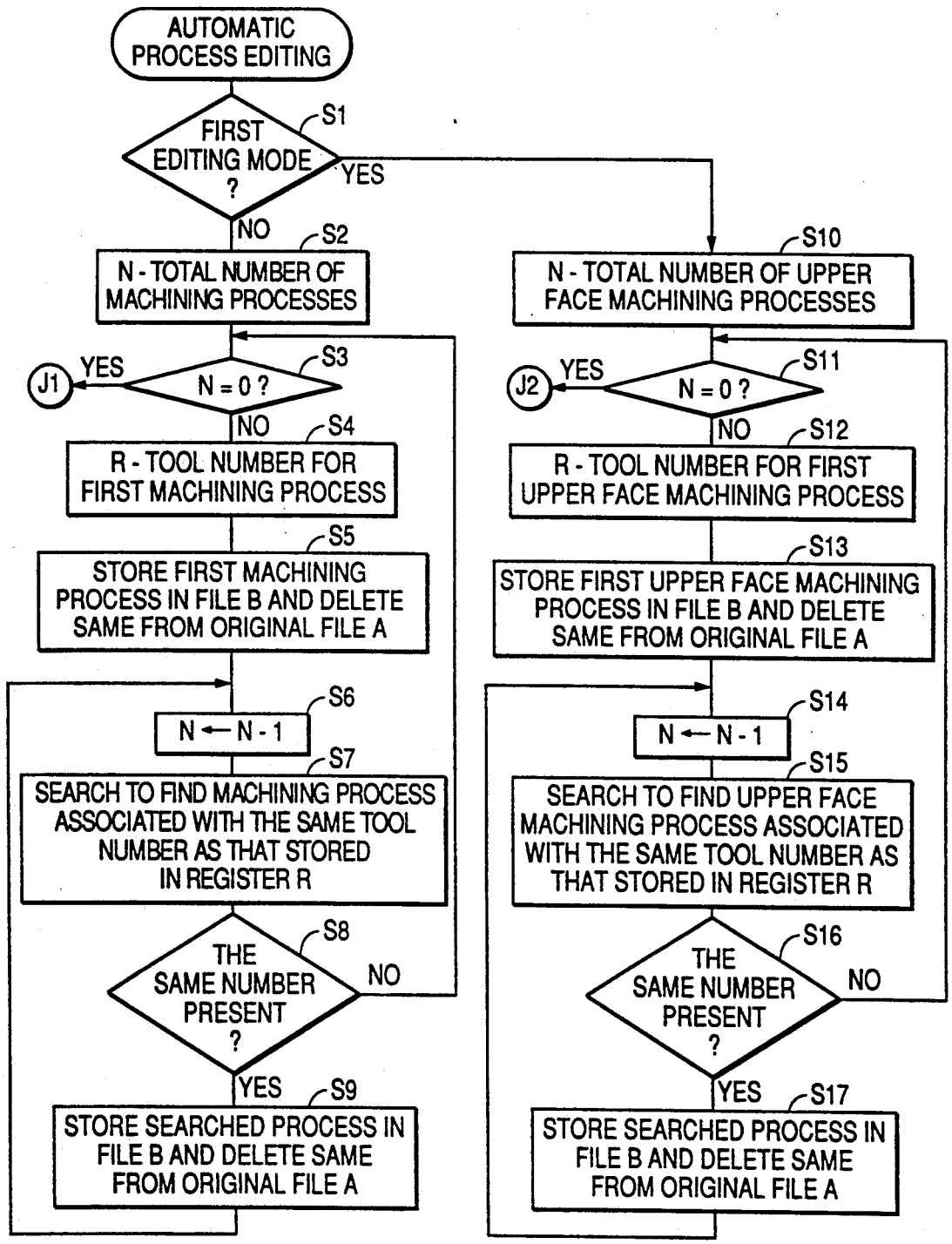
FIG. 2A is a flowchart showing part of automatic process editing processing executed by the automatic programming apparatus shown in FIG. 1.
Figure 2B:
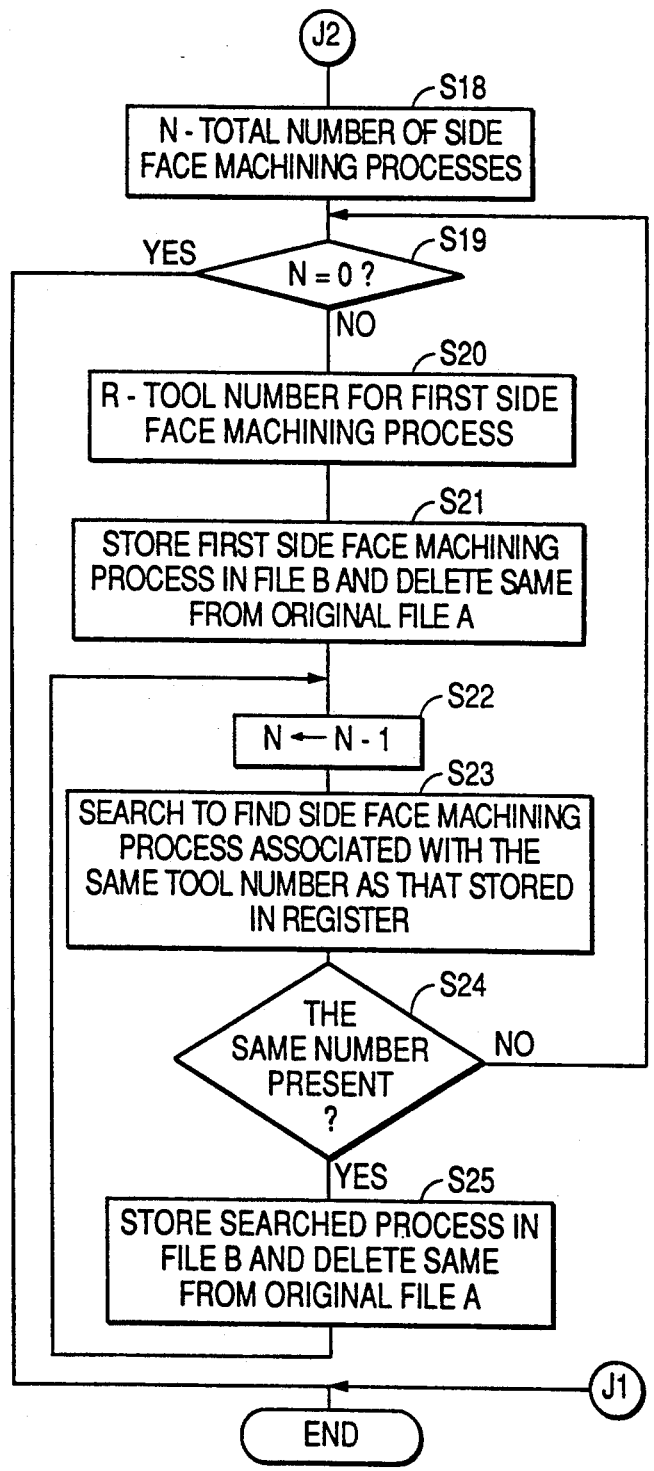
FIG. 2B is a flowchart showing the remaining part of the automatic process editing processing.

In the following, with reference to FIGS. 2A and 2B, automatic process editing processing by the automatic programming apparatus will be explained.

Upon start of the operation of the programming apparatus, in accordance with the control program stored in the ROM 11, the CPU 10 causes the part program and the system program, which are stored in the floppy disk 17, to be transferred to and stored in the RAM 12. At this time, the part program is stored in a first file A of the RAM 12. Next, the CPU 10 controls the CRT 14 in accordance with the system program, whereby the machining process definition statements contained in the part program, a message requesting selection of editing mode, and a display field of editing mode selection branch are displayed on the CRT screen.

A selection branch "first editing mode" or a selection branch "second editing mode" is alternately displayed on the editing mode selection branch display field each time the operator operates the mouse 15c of the tablet device 15 so as to move the graphic cursor onto the editing mode selection branch display field and then perform a pick operation with use of the mouse 15c. Further, if the selection branch displayed is picked by the mouse 15c, then the first or second editing mode corresponding thereto is selected. At this time, the operator selects the first editing mode if the machine tool belongs to the first type, and selects the second editing mode if it belongs to the second type. Next, when the operator inputs a process editing command through the keyboard 13 or the tablet device 15, the CPU 10 stores mode information indicative of the thus selected editing mode into a first register accommodated in the CPU, and starts the automatic process editing processing shown in FIGS. 2A and 2B.

At first, with reference to the mode information stored in the first register, the CPU 10 determines which of the first and second editing modes is selected (step S1). If the second editing mode is selected, the CPU 10 operates in accordance with the editing procedure according to the second editing mode and stored in the system program. Namely, the CPU 10 counts the machining process definition statements contained in the part program stored in the first file A and associated with the upper and side face machining, to thereby determine the total number of the machining processes, and stores the same in a second register N accommodated in the CPU (step S2). Then, the CPU further determines whether a register value N, indicative of the number of the remaining definition statements in the first file A, is equal to "0" or not (step S3). Since the register value N immediately after the start of the editing processing is not "1," the CPU 10 determines a tool number (hereinafter referred to as first tool number) specified in a first machining process definition statement in the part program, and stores the first tool number in a third register R accommodated in the CPU (step S4). Then, the CPU 10 causes the first definition statement to be transferred from the first file A of the RAM 12 to a second file B and to be stored in the latter file, deletes the definition statement from the first file A (step S5), and decreases the register value N by "1" (step S6).

Next, the CPU 10 searches for the remaining machining process definition statements stored in the first file A, from the top, to thereby determine whether or not definition statements each specifying the first tool are still present in the first file A (steps S7 and S8). If definition statements of this kind are present, the CPU causes a first one of them to be stored in the second file B, and then deletes the same from the first file A (step S9). Whereupon, the processing is returned to the step S6.

The steps S6–S9 are repeatedly executed as long as a definition statement specifying the first tool number stored in the third register R is present in the first file A. As a result, one or more definition statements (generally, a plurality of statements) each specifying the same tool number as the first tool number specified by the first machining process definition statement in the part program are collectively stored in a first memory region of the second file B. When it is determined at the step S8 that no definition statement specifying the first tool number is present in the first file A, the processing is returned to the step S3 wherein a determination is made as to whether the second register value N, indicative of the number of the remaining definition statements in the first file A, is equal to "0" or not. Generally, the remaining definition statements include definition statements specifying tool numbers other than the first tool number, and hence, a tool number (hereinafter referred to as second tool number) specified in a first one of the remaining definition statements is stored into the second register R (step S4). The definition statement concerned is transferred from the first file A to the second file B and is stored in the latter file, and is then deleted from the first file A (step S5). Thereafter, the steps S6–S9 are repeatedly executed as long as a definition statement specifying the second tool number is present in the first file A. As a result, one or more definition statements each specifying the second tool number are collectively stored in the second file B, in a manner separated from a group of the definition statements specifying the first tool number.

Whereupon, the steps S3–S9 are repeatedly executed as long as a definition statement associated with a tool number different from the tool number associated with the definition statements already stored in the second file B is present in the first file A, so that the definition statements for a respective tool number are collectively stored in the second file B. When all the definition statements have been transferred from the first file A to the second file B, it is determined at the step S3 immediately thereafter that the second register value N is "0," whereby the automatic machining process editing processing is completed.

In the case of applying the editing processing according to the aforesaid second editing mode to a part program so prepared as to perform 2 mm diameter center drilling and 10 mm diameter drilling onto the upper face of the six-faced polyhedron workpiece, effect similar two kinds of machining onto a first side face of the workpiece, and then effect similar machining onto a second side face of the workpiece, machining process definition statements in the part program are rearranged in the order shown in Table 1 given below and suited to a machine tool of a second type.

TABLE 1

Definition statement associated with 2 mm diameter center drilling onto the upper face
Definition statement associated with 2 mm diameter center drilling onto the first side face
Definition statement associated with 2 mm diameter center drilling onto the second side face
Definition statement associated with 10 mm diameter drilling onto the upper face
Definition statement associated with 10 mm diameter drilling onto the first side face
Definition statement associated with 10 mm diameter drilling onto the second side face Whereupon, the automatic programming apparatus automatically prepares a machining program on the basis of the edited part program which is comprised of the definition statements stored in the second file B and rearranged in the above manner. When the machine tool is operated in accordance with the machining program, center drilling is sequentially carried out onto the upper face, the first side face and the second side face of the workpiece, and then, drilling is carried out onto these workpiece faces in sequence.

On the other hand, if the first editing mode suited to a machine tool of a first type is manually selected, immediately after the start of the automatic process editing processing, the CPU 10 determines, with reference to the mode information stored in the first register, that the first editing mode is selected (step S1), and operates in accordance with an editing procedure of the first editing mode stored in the system program.

In this case, the CPU 10 counts up machining process definition statements contained in the part program stored in the first file A and associated with upper face machining, to thereby determine the total number of the machining statements of this kind. At this time, the CPU 10 refers to a machining face indication code attached to each statement. Then, the CPU 10 stores the count value indicative of the number of the definition statements associated with the upper face machining into the built-in second register N (step S10), and further determines whether the register value N is "0" or not (step S11). Since the register value N immediately after the start of the editing processing is not "0," the CPU 10 determines a tool number (hereinafter referred to as i-th tool number) specified in a first one of the definition statements associated with the upper face machining, and stores the i-th tool number into the third register R accommodated in the CPU (step S12). Whereupon, the CPU 10 causes the first definition statement among the definition statements associated with the upper face machining to be transferred from the first file A of the RAM 12 to the second file B and to be stored in the latter file, and causes the first definition statement to be deleted from the first file A (step S13), and further decreases the register value N by "1" (step S14).

Next, the CPU 10 searches for the remaining machining process definition statements stored in the first file A, from the top, to thereby determine whether or not definition statements each associated with upper face machining and specifying the i-th tool number are still present in the first file A (steps S15 and S16). If definition statements of this kind are present, the CPU causes a first one of them to be stored in the second file B, and then deletes the same from the first file A (step S17). Whereupon, the processing is returned to the step S14. The steps S15–S17 are repeatedly executed as long as a definition statement associated with the upper face machining and specifying the i-th tool number is present in the first file A. As a result, one or more definition statements each associated with the upper face machining process using a tool represented by the i-th tool number are collectively stored in a first memory region of the second file B.

When it is determined at the step S16 that no definition statement specifying the i-th tool number is present in the first file A, the processing is returned to the step S11 wherein a determination is made as to whether the second register value N, indicative of the number of the remaining definition statements associated with the upper face machining in the first file A, is equal to "0" or not. Generally, the remaining definition statements include definition statements specifying tool numbers other than the i-th tool number, and hence, an i+1-th tool number specified in a first one of the remaining definition statements is stored into the second register R (step S12). The definition statement concerned is transferred from the first file A to the second file B and is stored in the latter file, and is then deleted from the first file A (step S13). Thereafter, the steps S14–S17 are repeatedly executed as long as a definition statement specifying the i+1-th tool number is present in the first file A. As a result, one or more definition statements each specifying the i+1 tool number are collectively stored in the second file B.

Whereupon, the steps S11-S17 are repeatedly executed as long as a definition statement associated with a tool number different from the tool number associated with the definition statements already stored in the second file B and associated with the upper face machining is present in the first file A, so that the definition statements for a respective tool number are collectively stored in the second file B. When all the definition statements have been transferred from the first file A to the second file B, it is determined at the step S11 immediately thereafter that the second register value N is "0," so that step S18 is entered.

At the step S18, machining process definition statements contained in the first file A and associated with side face machining are counted up, whereby the total number of the definition statements of this kind is determined, and is stored in the second register N. Next, if it is determined that the register value N is not "0" (step S19), the CPU 10 determines a tool number (hereinafter referred to as j-th tool number) specified by a first one of the side face machining process definition statements, and stores the tool number in the third register R (step S20). Then, the first definition statement among the side face machining process definition statement is transferred from the first file A to the second file B, and is then deleted from the first file A (step S21), and the register value N is decreased by "1" (step S22).

Next, a determination is made as to whether or not a side face machining process definition statement specifying the j-th tool number is present in the first file A (steps S23 and S24). If a definition statement of this kind is present, such a statement is stored in the second file B and is deleted from the first file A (step S25). Then, the steps S22-S25 are repeatedly executed, so that the side face machining process definition statements specifying the j-th tool number are collectively stored in the first memory region of the second file B.

Whereupon, the steps S19-S25 are repeatedly executed in association with a j+1-th tool number and subsequent tool numbers, so that side face machining process definition statements associated with each of the j+1-th tool number and the subsequent tool numbers are collectively stored in the second file B. When all the side face machining process definition statements have been transferred from the first file A to the second file B, it is determined at the step S19 immediately thereafter that the second register value N is "0," whereby the automatic process editing processing is completed.

In the case of applying the editing processing according to the aforesaid first editing mode to a part program so prepared as to perform 2 mm diameter center drilling and 10 mm diameter drilling onto the upper face of the six-faced polyhedron workpiece, effect similar two kinds of machining onto a first side face of the workpiece, and then effect similar machining onto a second side face of the workpiece, machining process definition statements in the part program are rearranged in the order shown in Table 2 given below and suited to a machine tool of a first type.

TABLE 2

Definition statement associated with 2 mm diameter center drilling onto the upper face
Definition statement associated with 10 mm diameter drilling onto the upper face
Definition statement associated with 2 mm diameter center drilling onto the first side face
Definition statement associated with 2 mm diameter center drilling onto the second side face
Definition statement associated with 10 mm diameter drilling onto the first side face
Definition statement associated with 10 mm diameter drilling onto the second side face Whereupon, the automatic programming apparatus automatically prepares a machining program on the basis of the edited part program which is comprised of the definition statements stored in the second file B and rearranged in the above manner. When the machine tool is operated in accordance with the machining program, center drilling and drilling are sequentially carried out onto the upper face, center drilling onto the first side face and the second side face of the workpiece is carried out in sequence, and then drilling is carried out onto these side faces in sequence. A shift between the upper face machining and the side face machining occurs only once. Upon this shift, i.e., immediately after the completion of the drilling onto the upper face of the workpiece, the 10 mm diameter drill is detached from the spindle for the upper face machining, a L-type attachment is mounted to the spindle, and further the 2 mm diameter center drill is mounted to the L-type attachment. Subsequently, it is unnecessary to mount and dismount the L-type attachment to and from the spindle, so that operational efficiency never be deteriorated, attributable to mounting/dismounting of the L-type attachment. Contrary to this, according to the operation effected in accordance with the machining program corresponding to Table 1, the shift will be made three times. In the case of a machine tool provided with a spindle for upper face machining and a spindle for side face machining, the 10 mm diameter drill is detached from the upper face machining spindle immediately after completion of drilling onto the upper face of the workpiece, and then the 2 mm diameter drill is mounted to the side face machining spindle. In the meantime, the number of times of tool exchange for the upper and side face machining is three in each of the aforesaid two types of machine tools.

We claim:

1. An automatic editing method for multi-faced polyhedron machining processes, comprising the steps of:
    (a) automatically dividing multi-faced polyhedron machining processes defined beforehand in relation to an operation of a machine tool of a type inevitably entailing tool exchange when a shift is made between workpiece upper face machining and workpiece side face machining, into a first group of machining processes associated with the workpiece upper face machining and a second group of machining processes associated with the workpiece side face machining;
    (b) automatically dividing the first group of machining processes into ones for respective types of tools employed to conduct the first group of machining processes; and
    (c) automatically dividing the second group of machining processes into ones for respective types of tools employed to conduct the second group of machining processes.

2. An automatic editing method according to claim 1, wherein said method is applied to a machine tool which is provided with a spindle for a workpiece upper face machining, and a L-type attachment arranged to be mounted to and dismounted from the spindle.

3. An automatic editing method according to claim 1, wherein said method is applied to a machine tool which is provided with a first spindle for a workpiece upper face machining, and a second spindle for the workpiece side face machining.

4. An automatic editing method for multi-faced polyhedron machining processes, comprising the steps of:
  (a) selecting a first editing mode when it is determined that multi-faced polyhedron machining processes are associated with a first type of machine tool, the multi-faced polyhedron machining processes being defined beforehand in relation to either one of the first type of machine tool inevitably entailing tool change when a shift is made between workpiece upper face machining and workpiece side face machining, and a second type of machine tool not inevitably entailing tool change when the aforesaid shift is made;
  (b) selecting a second editing mode when it is determined that the multi-faced polyhedron machining processes defined beforehand are associated with the second type of machine tool;
  (c) automatically dividing the multi-faced polyhedron machining processes defined beforehand into a first group of machining processes associated with the workpiece upper face machining and a second group of machining processes associated with the workpiece side face machining, automatically dividing the first group of machining processes into ones for respective types of tools employed to conduct the first group of machining processes, and automatically dividing the second group of machining processes into ones for respective types of tools employed to conduct the second group of machining processes, when the first editing mode is selected; and
  (d) automatically dividing the multi-faced polyhedron machining processes defined beforehand into ones for respective types of tools employed to conduct the multi-faced polyhedron machining processes.

5. An automatic editing method according to claim 4, wherein said method is applied to a machine tool which is provided with a spindle for the workpiece upper face machining, and a L-type attachment arranged to be mounted to and dismounted from the spindle, and which belongs to the first type of machine tool.

6. An automatic editing method according to claim 4, wherein said method is applied to a machine tool which is provided with a first spindle for the workpiece upper face machining, and a second spindle for a workpiece side face machining, and which belongs to the first type of machine tool.

7. An automatic editing method according to claim 4, wherein said method is applied to a machine tool which is provided with a spindle stock, having a spindle adapted to be detachably mounted with a tool and arranged to be swivelable between a swivel position for the workpiece upper face machining and a swivel position for the workpiece side face machining and to be movable in a vertical direction, and a table, adapted to be detachably fixed with a workpiece and arranged to be swivelable around an axis perpendicular to a swivel axis of the spindle stock and to be movable in a horizontal direction, the machine tool belonging to the second type of machine tool.

* * * * *

UNITED STATES PATENT AND TRADEMARK OFFICE
CERTIFICATE OF CORRECTION

PATENT NO. : 5,283,750
DATED : February 1, 1994
INVENTOR(S) : Masaki Seki et al.

It is certified that error appears in the above-indentified patent and that said Letters Patent is hereby corrected as shown below:

Title page, number [75], "Toro Matunaka" should be

--Toru Matsunaka--.

Signed and Sealed this

Twenty-first Day of June, 1994

Attest:

BRUCE LEHMAN

*Attesting Officer*  *Commissioner of Patents and Trademarks*